United States Patent
Kefer et al.

[11] Patent Number: 6,029,454
[45] Date of Patent: Feb. 29, 2000

[54] STEAM-TURBINE PLANT

[75] Inventors: Volker Kefer, Erlangen; Armin Drosdziok, Essen, both of Germany

[73] Assignee: Siemens Aktiengesellschaft, Munich, Germany

[21] Appl. No.: 09/057,829

[22] Filed: Apr. 9, 1998

Related U.S. Application Data

[63] Continuation of application No. PCT/DE96/01924, Oct. 8, 1996.

[30] Foreign Application Priority Data

Oct. 9, 1995 [DE] Germany ............... 195 37 478

[51] Int. Cl.⁷ ........................................ F01K 7/31
[52] U.S. Cl. ................................ 60/653; 60/679
[58] Field of Search ................ 60/645, 653, 679, 60/690

[56] References Cited

U.S. PATENT DOCUMENTS

| | | |
|---|---|---|
| 3,178,891 | 4/1965 | Lawrance et al. . |
| 3,238,729 | 3/1966 | Frankel et al. ............ 60/653 |
| 4,653,277 | 3/1987 | Bozec .................. 60/690 X |
| 4,870,823 | 10/1989 | Silvestri, Jr. ............ 60/653 X |
| 5,404,724 | 4/1995 | Silvestri, Jr. . |
| 5,457,721 | 10/1995 | Tsiklauri et al. ............ 60/653 X |
| 5,850,739 | 12/1998 | Masnoi .................. 60/653 |

FOREIGN PATENT DOCUMENTS

| | | |
|---|---|---|
| 0206135A1 | 12/1986 | European Pat. Off. . |
| 0415314A1 | 3/1991 | European Pat. Off. . |
| 2358349 | 10/1974 | Germany . |
| 2553397 | 1/1977 | Germany . |
| 3905066A1 | 8/1990 | Germany . |
| 273803 | 7/1927 | United Kingdom . |

*Primary Examiner*—Hoang Nguyen
*Attorney, Agent, or Firm*—Herbert L. Lerner; Laurence A. Greenberg

[57] ABSTRACT

In order to obtain a particularly compact steam power plant (1) with a plurality of pressure stages (4a, 4b) mounted on a common turbine shaft (6), a condenser (10) is mounted at the outflow side in the axial direction of the turbine shaft (6) and a feed-water preheater (14) has a modular design. The feed-water preheater (14) has a plurality of heat exchanger modules (20, 22) which are arranged in a common housing (24) and may be heated by steam ($A_N$, $A_H$) tapped from one or all pressure stages (4a, 4b). The heat exchanger modules (20, 22) are mounted in series at the feed-water side and in parallel at the tapped steam side.

5 Claims, 1 Drawing Sheet

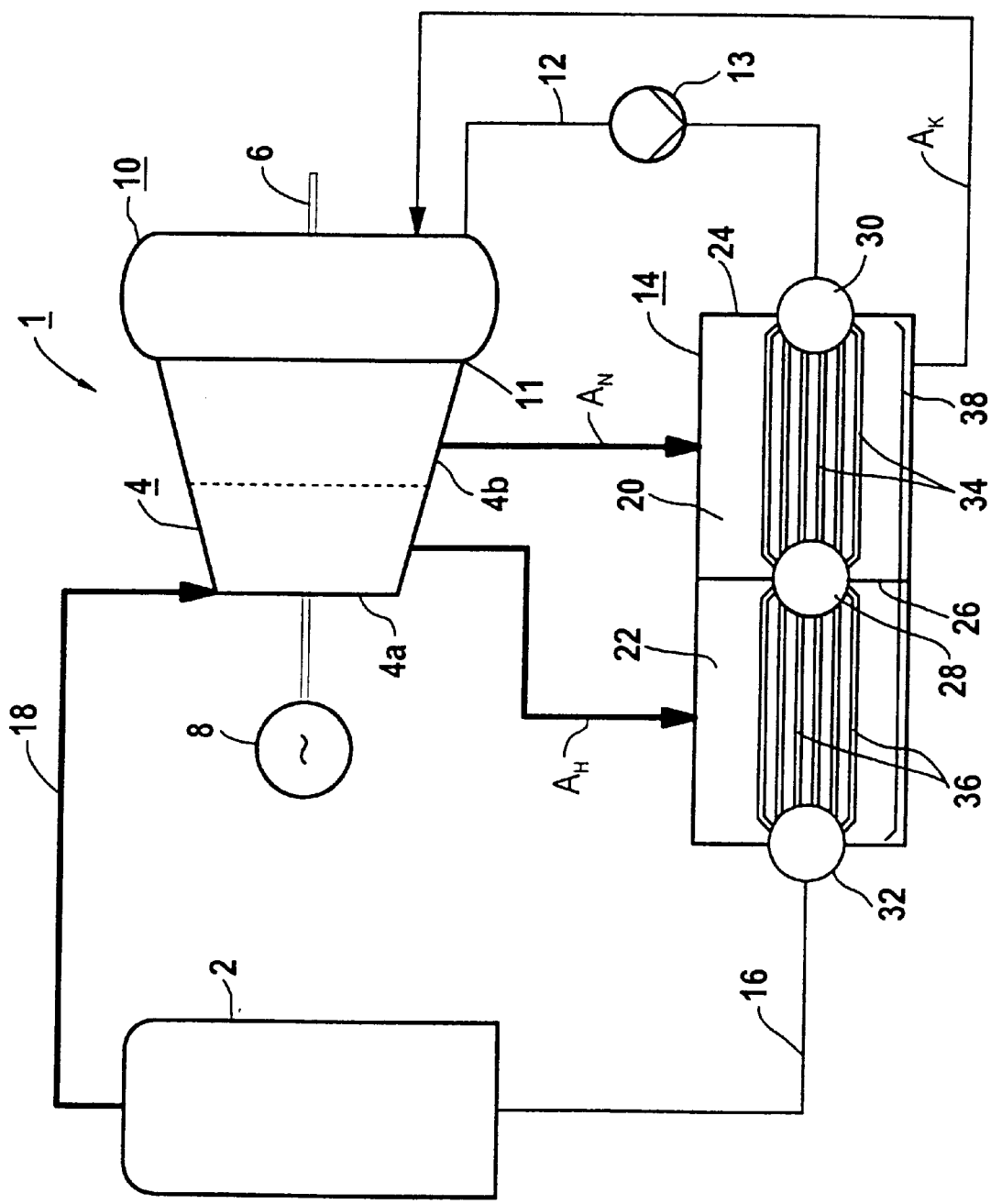

STEAM-TURBINE PLANT

CROSS-REFERENCE TO RELATED APPLICATION

This application is a continuation of International Application No. PCT/DE96/01924, filed Oct. 8, 1996, which designated the United States.

BACKGROUND OF THE INVENTION

FIELD OF THE INVENTION

The invention relates to a steam-turbine plant having a number of pressure stages disposed on a common turbine shaft.

In a steam-turbine plant, a condenser connected downstream of the steam turbine is normally disposed below the steam turbine. In addition, the steam-turbine plant includes a multiplicity of preheaters of a preheating section for preheating condensate or feedwater conducted in the steam cycle of the steam turbine. In order to connect the preheaters to one another and to the steam turbine, a correspondingly complex piping system is provided. U.S. Pat. No. 5,404,724, for example, discloses a steam-turbine plant having a multiplicity of such preheaters. Due to the type of construction of the steam turbine and due to the large number of structural components, such a steam-turbine plant is considerably expensive in terms of construction and requires considerable space. In addition, the assembly cost when erecting such a steam-turbine plant is especially high, particularly since the steam turbine disposed above the condenser necessitates a complicated supporting structure.

A steam-turbine plant having a number of pressure stages and having a condenser disposed on the downstream side in the axial direction of the turbine shaft has been disclosed in European Patent Application 0 206 135 A1, corresponding to U.S. Pat. No. 4,653,277.

SUMMARY OF THE INVENTION

It is accordingly an object of the invention to provide a steam-turbine plant, which overcomes the hereinafore-mentioned disadvantages of the heretofore-known devices of this general type, which is especially compact and which in addition can be assembled in an especially simple manner.

With the foregoing and other objects in view there is provided, in accordance with the invention, a steam-turbine plant, comprising a turbine shaft; a number of pressure stages disposed in common on the turbine shaft; a condenser disposed on an outflow side in axial direction of the turbine shaft; and a feedwater preheater having a feedwater side, a bled-steam side, a casing, a number of heat-exchanger modules to be heated with bled steam from at least one of the pressure stages, the heat-exchanger modules disposed in common in the casing and connected in series on the feedwater side and in parallel on the bled-steam side, a dividing wall in each case separating two adjacent heat-exchanger modules on the bled-steam side, and a collector in each case connecting the two adjacent heat-exchanger modules to one another on the feedwater side.

The invention starts out from the idea that, on one hand, the assembly cost during the erection of the steam-turbine plant is especially low because all of the relevant structural parts, in particular of the steam turbine and the condenser as well as of the feedwater preheater of the preheating section, are disposed at ground level. On the other hand, through the use of a compact type of construction of the preheating section, this preheating section can be disposed in an especially space-saving manner and in addition close beside the steam turbine. A compact type of construction of the preheating section can in turn be achieved by a modular construction of an individual feedwater preheater. Corresponding heat-exchanger modules may then be directly connected one behind the other on the feedwater side like a multiplex preheater so that connecting lines are saved. In addition, a further reduction in the assembly cost is achieved by the heat-exchanger modules being disposed in a common casing. A heat-exchanger module per se has been disclosed, for example, by German Published, Non-Prosecuted Patent Application DE 39 05 066 A1. The various pressure stages of the bled steam can be decoupled from one another particularly reliably through the separation of the heat exchanger modules in each case by the respective dividing wall.

In accordance with another feature of the invention, the pressure stages of the steam turbine and the condenser are disposed in a common casing.

In accordance with a further feature of the invention, each heat-exchanger module is in addition expediently adapted to a pressure stage, with regard to its design pressure, in order to especially effectively utilize the heat content of the bled steam that is fed in each case to the individual heat-exchanger modules and to thus achieve an especially high efficiency of the steam-turbine plant.

In accordance with an added feature of the invention, there is provided a collecting rail common to the heat-exchanger modules for condensed bled steam, in order to feed back bled steam condensed during the heat exchange inside the heat-exchanger modules.

In accordance with a concomitant feature of the invention, the steam turbine is constructed for half speed, for use in an output range up to about 350 MW. This means that the rotational frequency of the turbine shaft is equal to half the mains frequency (50 or 60 Hz) of the mains fed by the generator.

The advantages achieved with the invention reside in particular in the fact that, due to an axial configuration of the condenser on the outflow side of the turbine shaft, an especially high efficiency of the steam turbine is achieved because of the axial outflow of the expanded steam. Furthermore, due to the configuration of the condenser directly behind the outflow flood, the steam turbine can be set up virtually at ground level and thus without complicated supporting structures. An especially compact and space-saving type of construction is obtained overall in combination with the feedwater or multiplex preheater having a compact construction, which can likewise be set up at ground level and directly next to the steam turbine. The requirements imposed with regard to the statics and the size of the power house are therefore not great. Further-more, if it is assumed that plant components are lifted in and out with mobile cranes or truck-mounted cranes during assembly or even during a subsequent inspection, the power house can be constructed as pure weather protection. In addition, the concept described enables the components, in particular the heat-exchanger modules, to be largely prefabricated. Furthermore, only especially short pipe lines for bled steam, condensate return and feedwater feed are required. Therefore, the steam turbine and the condenser, as well as the feedwater delivery and feedwater preheating, can be planned and produced as an integrated unit.

Other features which are considered as characteristic for the invention are set forth in the appended claims.

Although the invention is illustrated and described herein as embodied in a steam-turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a diagrammatic and schematic illustration of an embodiment of a steam-turbine plant having a condenser disposed axially to a steam turbine and having a multiplex preheater.

DESCRIPTION OF THE PREFERRED EMBODIMENTS

Referring now in detail to the single FIGURE of the drawing, there is seen a steam-turbine plant which is part of a steam-power plant 1 having a steam generator 2. The steam-turbine plant includes a steam turbine 4 having a high-pressure stage 4a and a low-pressure stage 4b which drive a generator 8 through a common turbine shaft 6. The steam turbine 4 is constructed for half speed, i.e. the turbine shaft 6 rotates at half the mains frequency of the electric mains to be fed. A condenser 10 connected downstream of the steam turbine 4 and disposed with the steam turbine 4 in a common casing, is disposed on the outflow side in the axial direction of the turbine shaft 6 and thus next to the steam turbine 4.

An outlet side of the condenser 10 is connected to a feedwater preheater or multiplex preheater 14 through a feedwater line 12 in which a feedwater pump 13 is connected. An outlet side of the feedwater preheater 14 leads through a feedwater line 16 into the steam generator 2, which in turn has an outlet side connected through a live steam line 18 to the high-pressure part 4a of the steam turbine 4.

In the exemplary embodiment, the multiplex preheater 14 includes two heat-exchanger modules 20, 22 which are disposed in a common casing 24. Bled steam $A_N$ and $A_H$ is admitted to the respective heat-exchanger modules 20, 22 of the multiplex preheater 14. In this case, the pressure and the temperature of the bled steam $A_N$, $A_H$ are functions of the location of a respective bleed point of the steam turbine 4. In the exemplary embodiment, the bled steam $A_N$ is extracted from the low-pressure stage 4b of the steam turbine 4, whereas the bled steam $A_H$ is extracted from the high-pressure stage 4a of the steam turbine 4. Therefore, the bled steam $A_H$ has a high temperature and a high pressure, whereas the bled steam $A_N$ has a comparatively low temperature and a comparatively low pressure. The heat-exchanger modules 20, 22 which are disposed one behind the other are accordingly constructed for the different pressure ranges of the bled steam $A_H$ or $A_N$. Alternatively, however, bled steam $A_H$ from the high-pressure stage 4a of the steam turbine 4 or also bled steam $A_N$ from the low-pressure stage 4b of the steam turbine 4, may equally be fed to both heat-exchanger modules 20, 22. In addition, further heat-exchanger modules and/or further steam bleed points A may be provided.

In order to uncouple the pressure ranges of the heat-exchanger modules 20, 22 from one another, a dividing wall 26 is provided between the heat-exchanger module 20 and the heat-exchanger module 22. The heat-exchanger modules 20, 22 are therefore connected in parallel on the bled-steam side.

The heat-exchanger modules 20, 22 are connected to one another through a collector 28 on the feedwater side. In the exemplary embodiment, the collector 28 forms part of the dividing wall 26. Further collectors 30, 32 are provided at the respective feedwater-side inlet and outlet of the multiplex preheater 14.

In each case a number of feedwater tubes 34 and 36 are respectively provided in the heat-exchanger modules 20, 22. In this case, the feedwater tubes 34 of the heat-exchanger module 20 are connected on the inlet side to the inlet collector 30 and on the outlet side to the collector 28. Furthermore, the feedwater tubes 36 of the heat-exchanger module 22 are connected on the inlet side to the collector 28 and on the outlet side to the outlet collector 32. The heat-exchanger modules 20, 22 of the multiplex preheater 14 are therefore connected in series on the feedwater side.

A collecting rail 38, which is common to the heat-exchanger modules 20, 22, is provided for condensed bled steam $A_K$ in order to feed back condensed bled steam $A_N$, $A_H$ into the condenser 10.

Both the steam turbine 4 with the condenser 10 connected downstream and the multiplex preheater 14, are disposed at ground level and especially close together. Therefore, the space required for the steam-turbine plant is especially small.

We claim:
1. A steam-turbine plant, comprising:
   a turbine shaft;
   a number of pressure stages disposed in common on said turbine shaft;
   a condenser disposed on an outflow side in axial direction of said turbine shaft; and
   a feedwater preheater having a feedwater side, a bled-steam side, a casing, a number of heat-exchanger modules to be heated with bled steam from at least one of said pressure stages, said heat-exchanger modules disposed in common in said casing and connected in series on the feedwater side and in parallel on the bled-steam side, a dividing wall separating two adjacent heat-exchanger modules on the bled-steam side, and a collector connecting said two adjacent heat-exchanger modules to one another on the feedwater side.

2. The steam-turbine plant according to claim 1, including a common casing in which said pressure stages and said condenser are disposed.

3. The steam-turbine plant according to claim 1, wherein said heat-exchanger modules are each adapted to a respective one of said pressure stages.

4. The steam-turbine plant according to claim 1, including a collecting rail common to said heat-exchanger modules for condensed bled steam.

5. The steam-turbine plant according to claim 1, wherein said steam turbine is constructed for half speed.

* * * * *